United States Patent Office.

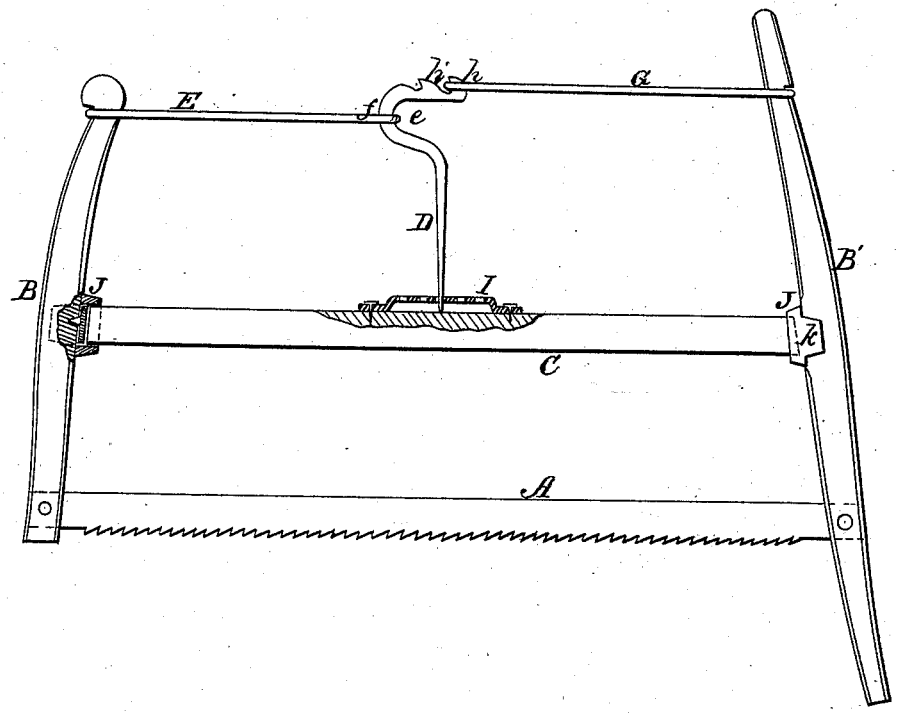

THOMAS H. ROLLINS, OF DETROIT, MAINE.

Letters Patent No. 99,596, dated February 8, 1870.

IMPROVEMENT IN SAW-FRAME.

The Schedule referred to in these Letters Patent and making part of the same

*To all whom it may concern:*

Be it known that I, THOMAS H. ROLLINS, of Detroit, in the county of Somerset, and State of Maine, have invented a new and useful Improvement in Buck-Saw Frames; and I do hereby declare that the following is a full, clear, and exact description thereof, which will enable others skilled in the art to make and use the same, reference being had to the accompanying drawing, forming part of this specification.

The object of this invention is to provide means for straining wood or buck-saws in their frames, by lever purchase, and to so connect the cross-bar with the stands, that the stands shall not be weakened by cutting mortises therein, as will be hereinafter more fully described.

The accompanying drawing represents the saw and frame, with the straining-device applied, showing the cross-bar sockets in section.

Similar letters of reference indicate corresponding parts.

A is the saw, which is attached to the stands B B', in the ordinary manner.

C is the cross-bar.

D is the straining-lever.

E is a rod, which is looped over the end of the stand B, as usual, and connected with the bottom of the curve $e$ of the lever, as seen at $f$.

G is another rod, which is looped over the end of the stand B', in the usual manner, and attached to the horizontal portion of the lever, as seen at $h$.

On this horizontal portion of the straining-lever D, there are one or more notches or hooks, $h'$, to receive the loop of the rod G.

I is a plate, fastened to the top of the bar C, provided with orifices, to receive the end of the straining-lever, as seen in the drawing, the plate being shown in vertical section. It will be seen, that by this arrangement, the saw is strained by a simple movement of the lever from one hole to another, while any "slack" may be taken up by moving the loop $h$, on the rod G, from one notch to another, on the top of the lever.

J J represent socket-pieces on the stands, for receiving and holding the cross-bar. These socket-pieces are formed with flanges $k$, as seen on E, between which the stand is held, while between the flanges $k$, on the bottom of the socket, there is a projecting flange, or points, as seen on B, which enter the stands, and prevent the socket from slipping or becoming displaced, thus avoiding the necessity of making mortises, and thereby weakening them.

Having thus described my invention,

What I claim as new, and desire to secure by Letters Patent, is—

A buck-saw frame, provided with a straining-lever, D, loop-rods G E, perforated plate I, cross-bar C, and sockets J, all constructed as described.

THOMAS H. ROLLINS.

Witnesses:
JOTHAM S. SMITH,
EDWIN A. PRATT.